(12) United States Patent
Nichols et al.

(10) Patent No.: US 8,760,967 B2
(45) Date of Patent: Jun. 24, 2014

(54) GENERATING AN ANGLE DOMAIN COMMON IMAGE GATHER

(75) Inventors: David E. Nichols, Houston, TX (US);
Madhav Vyas, Houston, TX (US);
Everett C. Mobley, Houston, TX (US)

(73) Assignee: WesternGeco L.L.C., Houston, TX (US)

( * ) Notice: Subject to any disclaimer, the term of this patent is extended or adjusted under 35 U.S.C. 154(b) by 484 days.

(21) Appl. No.: 13/080,788

(22) Filed: Apr. 6, 2011

(65) Prior Publication Data
US 2012/0092962 A1    Apr. 19, 2012

(51) Int. Cl.
*G01V 1/28*    (2006.01)

(52) U.S. Cl.
USPC ............................................. 367/53; 702/190

(58) Field of Classification Search
CPC ............................. G01V 1/28; G01V 2210/44
USPC ...................................................... 367/53, 73
See application file for complete search history.

(56) References Cited

U.S. PATENT DOCUMENTS

| 5,285,422 | A | 2/1994 | Gonzalez et al. |
| 6,546,339 | B2 | 4/2003 | Bevc et al. |
| 2008/0247272 | A1 | 10/2008 | Pan |
| 2009/0251995 | A1* | 10/2009 | Nichols ............................ 367/73 |
| 2011/0069582 | A1 | 3/2011 | Nichols et al. |

OTHER PUBLICATIONS

Biondi, B., "Common-image Gathers," 3D Seismic Imaging, Society of Exploration Geophysicists, 2006, Ch. 6, pp. 65-81.*
International Search Report and Written Opinion of PCT Application No. PCT/US2011/055922 dated May 1, 2012.
Vyas et al., "C014: Angle Gathers by Reverse-time Migration," 72nd EAGE Conference & Exhibition incorporating SPE EUROPEC 2010, Jun. 2010: pp. 1-5.
Yoon et al., "Reverse-time migration using the Poynting vector," Exploration Geophysics, 2006, vol. 37: pp. 102-107.

* cited by examiner

*Primary Examiner* — Isam Alsomiri
*Assistant Examiner* — Daniel L Murphy

(57) ABSTRACT

A technique includes processing first data indicative of a first image of a subsurface region of interest on a machine to generate second data indicative of a second image. The first image is derived from measurements of seismic waves, which propagate in a plurality of directions, and the second image is generated by partitioning the first image based on the directions. The technique includes processing the second data to determine a dip decomposition for each of the directions; and based on the dip decompositions and the directions, generating an angle domain common image gather.

17 Claims, 6 Drawing Sheets

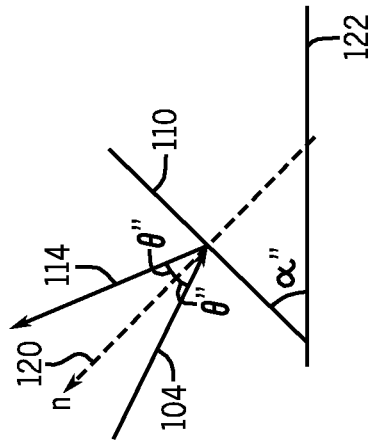
FIG. 3A
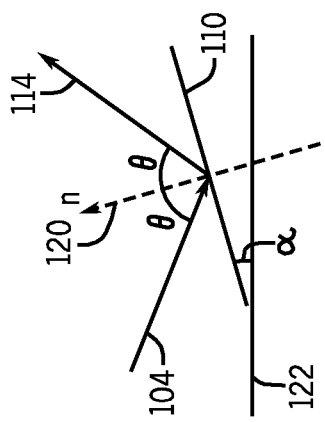
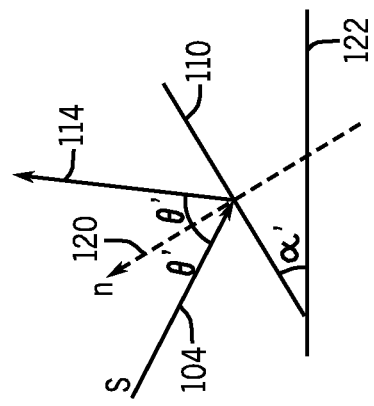
FIG. 3B
FIG. 3C

GENERATING AN ANGLE DOMAIN COMMON IMAGE GATHER

BACKGROUND

The invention generally relates to generating an angle domain common image gather.

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones and/or accelerometers), and industrial surveys may deploy only one type of sensor or both. In response to the detected seismic events, the sensors generate electrical signals to produce seismic data. Analysis of the seismic data can then indicate the presence or absence of probable locations of hydrocarbon deposits.

Some surveys are known as "marine" surveys because they are conducted in marine environments. However, "marine" surveys may be conducted not only in saltwater environments, but also in fresh and brackish waters. In one type of marine survey, called a "towed-array" survey, an array of seismic sensor-containing streamers and sources is towed behind a survey vessel.

SUMMARY

In an embodiment of the invention, a technique includes processing first data indicative of a first image of a subsurface region of interest on a machine to generate second data indicative of a second image. The first image is derived from measurements of seismic waves, which propagate in a plurality of directions, and the second image is generated by partitioning the first image based on the directions. The technique includes processing the second data to determine a dip decomposition for each of the directions; and based on the dip decompositions and the directions, generating an angle domain common image gather.

In another embodiment of the invention, an article includes a computer readable storage medium to store instructions that when executed by a computer cause the computer to process first data indicative of a first image of a subsurface region of interest to generate second data indicative of a second image. The first image is derived from measurements of seismic waves, which propagate in a plurality of directions; and the second image is generated by partitioning the first image based on the directions. The instructions when executed by the computer cause the computer to process the second data to determine a dip decomposition for each of the directions; and based on the dip decompositions and the directions, generate an angle domain common image gather.

In yet another embodiment of the invention, a system includes an interface and a processor. The interface receives first data indicative of a first image of a subsurface region of interest, and the first image is derived from measurements of seismic waves propagating in a plurality of directions. The processor processes the first data to partition the first image based on the directions to generate second data, which is indicative of a second image. The processor processes the second data to determine a dip decomposition for each of the directions and based on the dip decompositions and the directions, generates an angle domain common image gather.

Advantages and other features of the invention will become apparent from the following drawing, description and claims.

BRIEF DESCRIPTION OF THE DRAWING

FIGS. 3A, 3B and 3C are two-dimensional illustrations of a seismic wave reflecting an image point for different dips according to embodiments of the invention.

DETAILED DESCRIPTION

Figure 1:
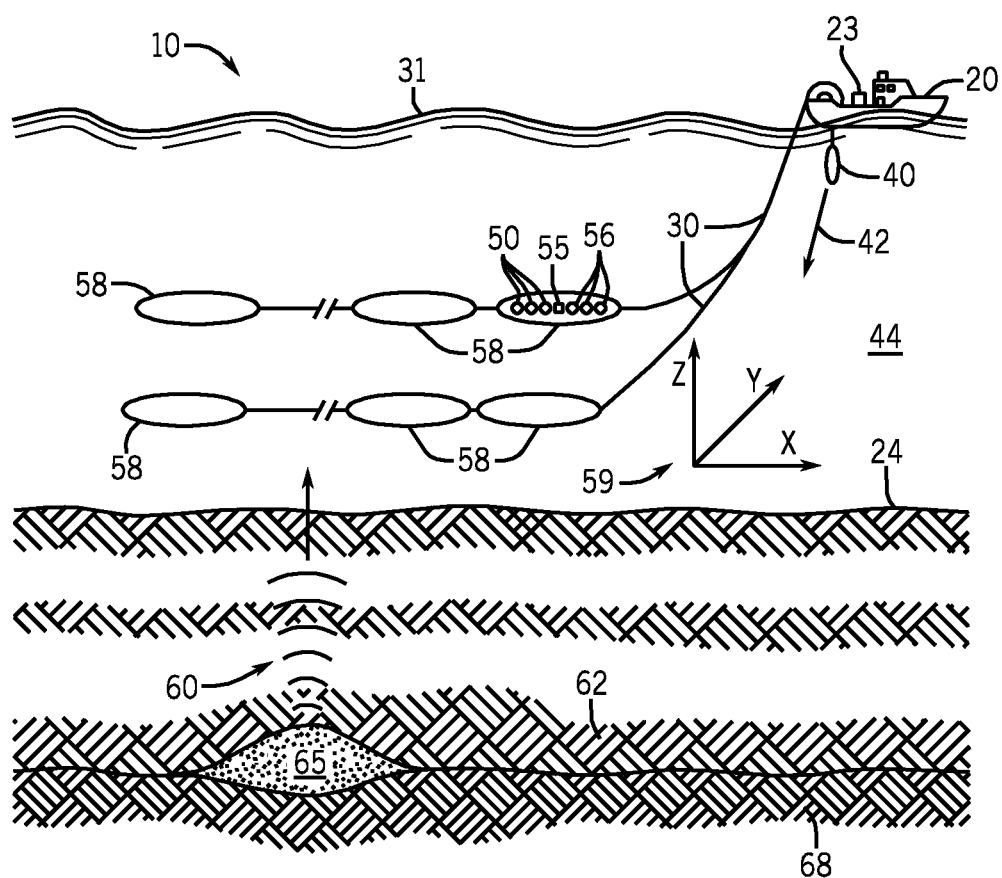
FIG. 1 is a schematic diagram of a data acquisition system according to an embodiment of the invention.

Systems and techniques are disclosed herein for purposes of generating an angle domain common image gather based on seismic data acquired in a land-based or marine-based seismic acquisition. As a non-limiting example, FIG. 1 depicts a marine-based seismic data acquisition system 10 in accordance with some embodiments of the invention. The system 10 includes a survey vessel 20, which tows one or more seismic streamers 30 (one exemplary streamer 30 being depicted in FIG. 1) behind the vessel 20. In one non-limiting example, the streamers 30 may be arranged in a spread in which multiple streamers 30 are towed in approximately the same plane at the same depth. As another non-limiting example, the streamers 30 may be towed at multiple depths, such as in an over/under spread, as depicted in FIG. 1.

Each seismic streamer 30 may be several thousand meters long and may contain various support cables (not shown), as well as wiring and/or circuitry (not shown) that may be used to support communication along the streamers 30. In general, the streamer 30 includes a primary cable into which is mounted seismic sensors that record seismic signals.

In accordance with embodiments of the invention, the streamer 30 is a multi-component streamer, which means that the streamer 30 contains particle motion sensors 56 and pressure sensors 50. The pressure 50 and particle motion 56 sensors may be part of a multi-component sensor unit 58. Each pressure sensor 50 is capable of detecting a pressure wavefield, and each particle motion sensor 56 is capable of detecting at least one component of a particle motion that is associated with acoustic signals that are proximate to the sensor 56. Examples of particle motions include one or more components of a particle displacement, one or more components (inline (x), crossline (y) and vertical (z) components (see axes 59, for example)) of a particle velocity and one or more components of a particle acceleration.

Depending on the particular embodiment of the invention, the streamer 30 may include hydrophones, geophones, particle displacement sensors, particle velocity sensors, accelerometers, pressure gradient sensors, or combinations thereof.

As a non-limiting example, in accordance with some embodiments of the invention, the particle motion sensor 56 measures at least one component of particle motion along a particular sensitive axis 59 (the x, y or z axis, for example). As a more specific example, the particle motion sensor 56 may measure particle velocity along the depth, or z, axis; particle velocity along the crossline, or y, axis; and/or velocity along the inline, or x, axis. Alternatively, in other embodiments of the invention, the particle motion sensor(s) 56 may sense a particle motion other than velocity (an acceleration, for example).

In addition to the streamer(s) 30 and the survey vessel 20, the marine seismic data acquisition system 10 also includes one or more seismic sources 40 (one exemplary seismic source 40 being depicted in FIG. 1), such as air guns and the like. In some embodiments of the invention, the seismic source(s) 40 may be coupled to, or towed by, the survey vessel 20. Alternatively, in other embodiments of the invention, the seismic source(s) 40 may operate independently of the survey vessel 20, in that the source(s) 40 may be coupled to other vessels or buoys, as just a few examples.

As the seismic streamers 30 are towed behind the survey vessel 20, acoustic signals 42 (an exemplary acoustic signal 42 being depicted in FIG. 1), often referred to as "shots," are produced by the seismic source(s) 40 and expand radially with a vertical component through a water column 44 into strata 62 and 68 beneath a water bottom surface 24. The acoustic signals 42 are reflected from the various subterranean geological formations, such as an exemplary formation 65 that is depicted in FIG. 1.

The incident acoustic signals 42 that are created by the seismic source(s) 40 produce corresponding reflected acoustic signals, or pressure waves 60, which are sensed by the towed seismic sensors. It is noted that the pressure waves that are received and sensed by the seismic sensors include "up going" pressure waves that propagate to the sensors without reflection, as well as "down going" pressure waves that are produced by reflections of the pressure waves 60 from an air-water boundary, or free surface 31.

The seismic sensors generate signals (digital signals, for example), called "traces," which indicate the acquired measurements of the pressure and particle motion wavefields. The traces are recorded and may be at least partially processed by a signal processing unit 23 that is deployed on the survey vessel 20, in accordance with some embodiments of the invention. For example, a particular pressure sensor 50 may provide a trace, which corresponds to a measure of a pressure wavefield by its hydrophone; and a given particle motion sensor 56 may provide (depending on the particular embodiment of the invention) one or more traces that correspond to one or more components of particle motion.

The goal of the seismic acquisition is to build up an image of a survey area for purposes of identifying subterranean geological formations, such as the exemplary geological formation 65. Subsequent analysis of the representation may reveal probable locations of hydrocarbon deposits in subterranean geological formations. Depending on the particular embodiment of the invention, portions of the analysis of the representation may be performed on the seismic survey vessel 20, such as by the signal processing unit 23. In accordance with other embodiments of the invention, the representation may be processed by a data processing system that may be, for example, located on land, on a streamer 30, distributed on several streamers 30, on a vessel other than the vessel 20, etc.

Angle domain common image gathers typically are useful for such purposes as migration velocity analysis and improving the image quality through stacking. Wavefield continuation migration techniques may be used to generate angle domain common image gathers, and these techniques typically rely on the decomposition of the wavefield into its plane wave components. This decomposition may either be carried out before or after imaging. Although pre-imaging techniques typically are considered relatively more accurate, these techniques are not common in the industry mainly because of their prohibitive cost. However, in accordance with the techniques and systems disclosed herein, a relatively lower cost pre-imaging technique may be employed to generate an angle domain common image gather.

Figure 2:
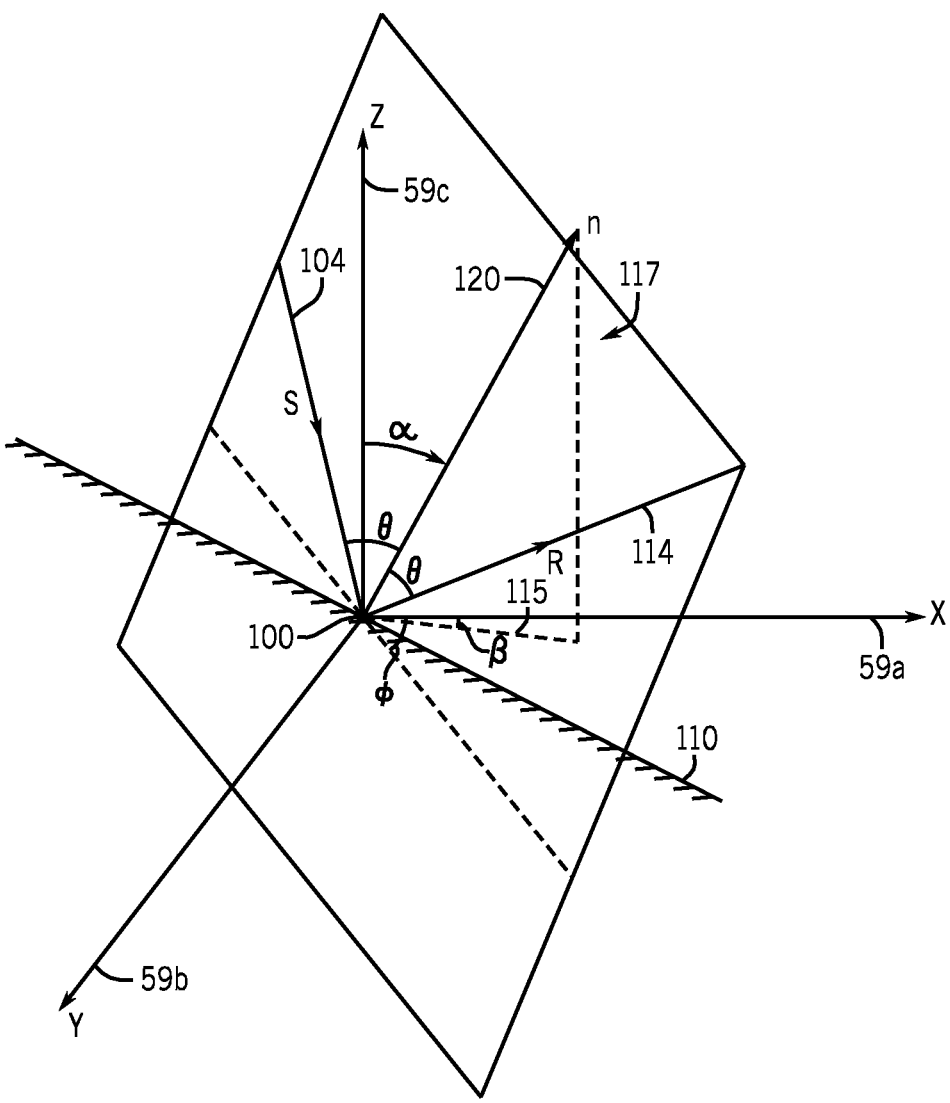
FIG. 2 is a three-dimensional illustration of a seismic wave reflecting at an image point according to an embodiment of the invention.

The angle domain common image gather is a function of an angle of incidence, or opening angle and an azimuth. To illustrate these parameters, FIG. 2 illustrates an incoming source wavefield (represented by source vector 104) and a corresponding reflected receiver wavefield (represented by receiver vector 114) at a given exemplary image point 100. This particular example is illustrated using a Cartesian coordinate system that has reference x (inline) 59a, y (crossline) 59b and z (depth) 59c axes. The source wavefield reflects off of a reflector surface; and the source vector 104, receiver vector 114 and a line 110 that is tangential to the reflector surface are contained in the same plane. As shown in FIG. 2, reflector surface is not a perfect horizontal plane. The normal 120 to the reflector plane makes an angle, $\alpha$, called the "dip" with the z-axis (59c) and the projection 115 of the normal 120 on the x-y plane makes an angle $\beta$ with the x-axis (59a). $\beta$ is called the reflector azimuth In FIG. 2, $\theta$ is the opening angle that each of the source and the receiver wavefields make with respect to the normal axis 120. As also illustrated in FIG. 2, a reflection azimuth $\phi$, which represents a bearing of the plane 117 that contains the source vector 104, receiver vector 114, and the normal axis 120. Given the Snell's law of reflection, it has been discovered that for the purposes of determining the $\theta$ opening angle and $\phi$ reflection azimuth at the image point 100, it is sufficient to only estimate the direction of either the source or receiver wavefield instead of both. In order to estimate the direction one of several different techniques may be used, such as full plane wave decomposition at the image point 100, a matching pursuits approach, a technique using the Poynting vector or ray tracing, as just a few non-limiting examples. As illustrated in FIG. 2, the direction of the source or receiver wavefield unambiguously determines the $\theta$ opening angle and $\phi$ reflection azimuth for a given reflector geometry. If the $\alpha$ dip and $\beta$ azimuth are estimated at the image point 100, then it is sufficient to determine just one of the source or the receiver wavefield directions. Here, the $\theta$ opening angle implicitly means the phase opening angle, however, if a group angle is measured it can be transformed to phase angle and hence the methods and arguments hold for general anisotropic media.

As illustrated in FIGS. 3A, 3B and 3C for a two dimensional (2-D) case, the $\theta$ opening angle may be different for the same source direction for different $\alpha$ dips. In this manner, FIGS. 3A, 3B and 3C illustrate three different dips labeled as "$\alpha$," "$\alpha'$" and "$\alpha''$," respectively, which produce different opening angles called "$\theta$," "$\theta'$," and "$\theta''$," respectively for the same source direction. Thus, if the $\alpha$ dip and source direction are known, the $\theta$ opening angle may be determined. It is noted that the source direction is described herein as a specific example, as the direction of the receiver wavefield and the $\alpha$ dip may be used for purposes of determining the $\theta$ opening angle, in accordance with other embodiments of the invention. Likewise, in the three-dimensional (3-D) case, the $\theta$ opening angle and the $\phi$ reflection azimuth may be determined for a given source or receiver direction if $\alpha$ and $\beta$ are known.

The $\alpha$ dip at the imaging point varies according to the source direction; and as a result, there may be multiple source directions and multiple corresponding dips present at the image point. Therefore, incorrect results may be obtained by merely estimating a single dip for each image point. In accordance with embodiments of the invention disclosed herein, a technique 150 (see FIG. 4) determines θ opening angles for all of the possible α dips that are present at the image point for purposes of determining an angle domain common image gather.

Figure 4:
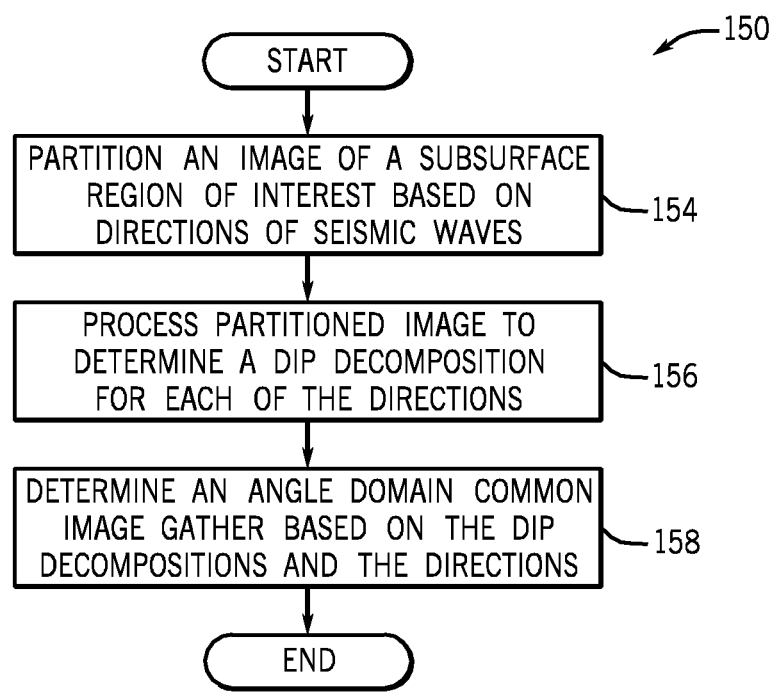
FIGS. 4 and 5 are flow diagram depicting technique to generate angle domain common image gathers according to embodiments of the invention.

More specifically, referring to FIG. 4, in accordance with embodiments of the invention disclosed herein, the technique 150 includes processing data indicative of a first image of a subsurface region of interest to partition (block 154) this first image based on directions of seismic waves used to acquire the first image to generate a second image. The second image is processed (block 156) to determine a dip decomposition for each of the directions. The technique 150 includes, based on the dip decompositions, and the directions, determining (block 158) an angle domain common image gather.

More specifically, in accordance with embodiments of the invention described herein, the migration image is partitioned as a function of source direction vectors that are measured at the image point during migration. This partitioning may be performed either in the time domain or in the frequency domain, depending on the particular embodiment of the invention. As a specific non-limiting example, the partitioning of the image may be performed as a simple binning, such as pursuant to a technique that assigns partition weights of either one or zero. However, other weighting schemes may be employed, in accordance with other embodiments of the invention.

The source direction may be determined through such techniques as ray tracing from the shot to the image point or alternatively, by determining the direction on the source wavefield through plane wave decomposition, the use of the Poynting vector or by calculating travel time derivatives, as just a few non-limiting examples. The source direction may be determined using other techniques, in accordance with other embodiments of the invention.

After the partitioning, an image called "$I(x,y,z,\vec{p}_s)$" may thus be formed, where "I" represents the image acquired through migration; x, y and z are spatial coordinates and "$\vec{p}_s$" represents the source direction vector. For purposes of performing a dip decomposition on the $I(x, y, z, \vec{p}_s)$ image, the $I(x,y,z,\vec{p}_s)$ partitioned image is first Fourier transformed into the wavenumber domain, as set forth below:

$$I(x,y,z,\vec{p}_s) \Rightarrow I(k_x,k_y,k_z,\vec{p}_s), \qquad \text{Eq. 1}$$

where "$k_x$" represents the inline spatial wavenumber, "$k_y$" represents the crossline wavenumber, and "$k_z$" represents the depth spatial wavenumber.

In wavenumber space, the $I(k_x,k_y,k_z,\vec{p}_s)$ partitioned image is decomposed into corresponding dip decompositions for each $\vec{p}_s$ source direction; and each of these dip decompositions is further processed to generate the θ opening angles and φ azimuths for each source direction. More specifically, for each source direction, a dip is determined for each $k_x$, $k_y$, and $k_z$ wavenumber combination. In this manner, in accordance with embodiments of the invention described herein, the dip may be determined as follows:

$$\alpha = \tan^{-1}\left(\frac{\sqrt{k_x^2 + k_y^2}}{k_z}\right). \qquad \text{Eq. 2}$$

Moreover, the β reflector azimuth may be determined as follows:

$$\beta = \tan^{-1}\left(\frac{k_x}{k_y}\right). \qquad \text{Eq. 3}$$

After the α dip and the β azimuth are determined pursuant to Eqs. 2 and 3, the normal to the reflector may be estimated as follows:

$$n_x = \sin(\beta)\sin(\alpha), \qquad \text{Eq. 4}$$

$$n_y = \cos(\beta)\sin(\alpha), \text{ and} \qquad \text{Eq. 5}$$

$$n_z = \cos(\alpha), \qquad \text{Eq. 6}$$

where "$n_x$," "$n_y$," and "$n_z$" represent the x, y and z components, respectively, of the unit normal called "$\hat{n}$" to the reflector. The θ opening angle may be determined by taking the dot product of the $\hat{n}$ unit normal and the $\vec{p}_s$ source direction vector; and the φ azimuth may be determined taking the cross product of the $\hat{n}$ unit normal and the $\vec{p}_s$ source direction vector. Thus, the $I(k_x,k_y,k_z,\vec{p}_s)$ image may be partitioned in wavenumber space based on the θ opening angle and the φ reflection azimuth as follows:

$$I(k_x,k_y,k_z,\vec{p}_s) \Rightarrow I(k_x,k_y,k_z,\theta,\phi). \qquad \text{Eq. 7}$$

To derive the angle domain image gather, called I(x, y, z, θ, φ) the image derived in Eq. 7 is inverse Fourier transformed. It is noted that although dip decomposition is described herein as being performed in the Fourier domain, the dip decomposition may be performed using other transformations, such as transformations that are carried out in any other domain, such as the space domain, the wavelet domain or the curvelet domain, as just a few non-limiting additional examples.

Figure 5:
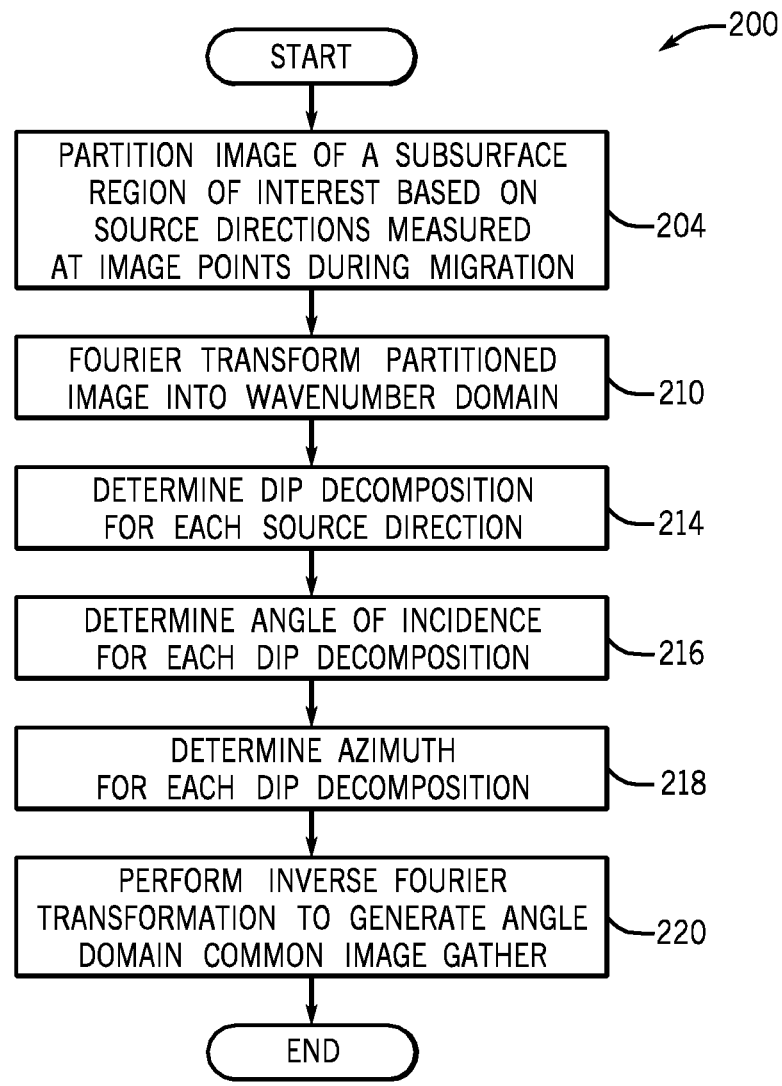

Referring to FIG. 5, to summarize, a technique 200 in accordance with embodiments of the invention includes partitioning an image based on a source direction measured at image points during migration, pursuant to block 204. The partitioned image is Fourier transformed (block 210) into the wavenumber domain, pursuant to block 210. Subsequently, the technique 200 includes determining (block 214) a dip decomposition for each source direction. From the source directions and dip decompositions, the θ opening angles and φ azimuths may then be determined, pursuant to blocks 216 and 218. Lastly, the technique 200 includes performing an inverse Fourier transformation to generate an angle domain common image gather, pursuant to block 220.

Figure 6:
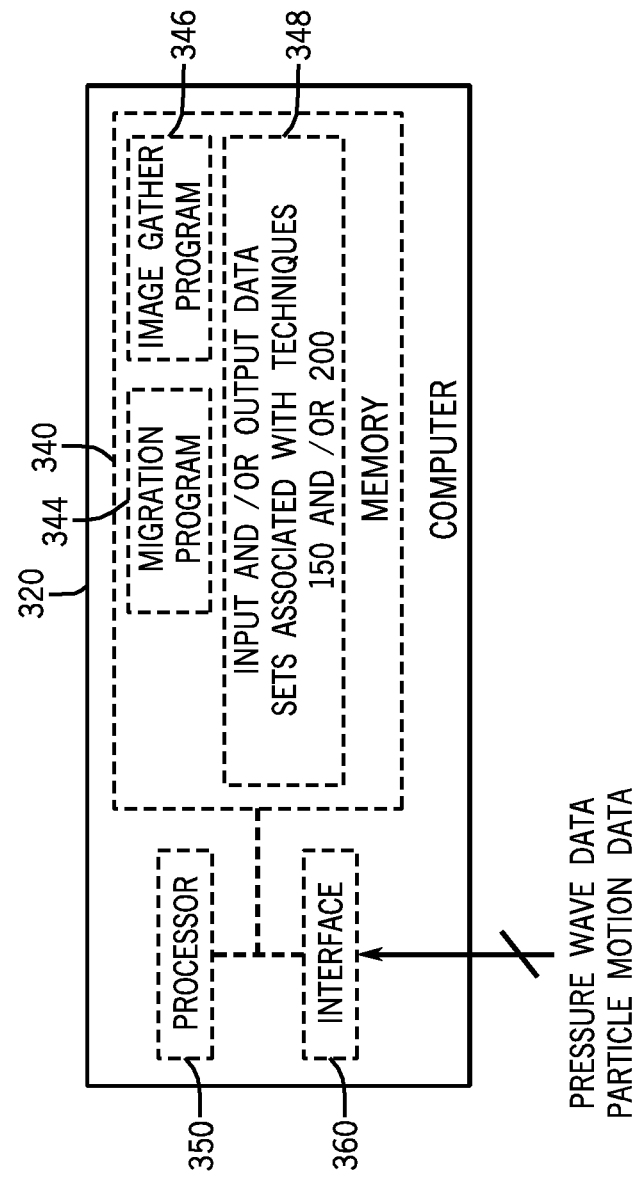
FIG. 6 is a schematic diagram of a data processing system according to an embodiment of the invention.

Referring to FIG. 6, a data processing system 320 may be used for purposes of generating an angle domain common image gather in accordance with the techniques that are disclosed herein. The data processing system 320 may be part of the signal processing unit 23 (see FIG. 1) or may be performed by another remote or local computing platform, depending on the particular embodiment of the invention. It is noted that the architecture of the processing system 320 is illustrated merely as an example, as the skilled artisan would recognize many other variations and deviations therefrom. For example, in accordance with some embodiments of the invention, the processing system may be a distributed system that is located at different local and/or remote locations. All or part of the data processing system 320 may be disposed on the vessel 20, on a streamer 30, on a platform, at a remote processing facility, etc., depending on the particular embodiment of the invention.

In the example that is depicted in FIG. 6, the data processing system 320 includes a processor 350, which executes program instructions for purposes of causing the processor 350 to perform some or all of the techniques that are disclosed herein. As a non-limiting example, these program instructions may include, for example, program instructions 344 to cause the processor 350 to perform migration (reverse time migration, for example) and program instructions 346 to cause the processor 350 to perform the image gather generation techniques that are disclosed herein. As further non-limiting examples, the processor 350 may include one or more microprocessors and/or microcontrollers, depending on the particular implementation. In general, the processor 350 may execute the program instructions, such as the program instructions 344 and 346, for purposes of causing the processor 350 to perform all or parts of the techniques 150 and/or 200, which are disclosed herein as well as other techniques that cause the processor 350 to generate an angle domain common image gather, in accordance with many various embodiments of the invention.

The system memory 340 may also store datasets 348, which may be initial, intermediate and/or final datasets produced by the processing by the processor 350. For example, the datasets 348 may include data indicative of seismic data, data indicative of partitioned migration data, data indicative of source directions, data indicative of receiver directions, data indicative of wavenumber images, data indicative of dips, data indicative of azimuths, data indicative of normal directions, etc.

As depicted in FIG. 6, the processor 350 and memory 340 may be coupled together by at least one bus, which may couple other components of the processing system 320 together, such as an interface 360. As a non-limiting example, the interface 360 may be a network interface, an interface to storage media (magnetic mass storage media, optical mass storage media, removable media, USB memory, CD-ROM, etc.), a wireless interface, etc. Among its other features, the processing system 320 may include a display (not shown in FIG. 6), which may display the initial, intermediate and/or final results that are produced by the processing system 320. As a non-limiting example, this display may display an image, which graphically depicts migration images, partitioned images, wavenumber space images, dip decompositions, azimuths, etc.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
    processing first data representing a first image of a subsurface region of interest on a machine to partition the first image to generate second data representing a second image, wherein the first image is derived from measurements of seismic waves and the partitioning comprising partitioning the first image according to one of a source wavefield direction or a receiver wavefield direction without partitioning the first image according to the other of the source wavefield direction and the receiver wavefield direction;
    processing the second data to determine a dip decomposition for each of the directions associated with the partitioning; and
    based on the processing of the second data, generating an angle domain common image gather.

2. The method of claim 1, wherein the act of processing the second data comprises:
    performing a Fourier transformation of the second image to generate a wavenumber domain representation of the second image; and
    processing the wavenumber domain representation to determine the dip decompositions.

3. The method of claim 2, wherein the act of determining the angle domain common image gather comprises:
    based on the dip decomposition associated with the direction associated with the partitioning, determining an angle of incidence for each of the directions.

4. The method of claim 3, wherein the act of determining the angle domain common image gather further comprises:
    based on the dip decomposition associated with the direction associated with the partitioning, determining an azimuth for each of the directions.

5. The method of claim 3, wherein the act of determining the angle domain common image gather further comprises:
    forming a third image based on the angles of incidence and the wavenumber domain representation of the second image; and
    performing an inverse Fourier transformation of the third image to generate the angle domain common image gather.

6. The method of claim 1, further comprising:
    performing migration based on the measurements to generate the first data; and
    determining directions associated with the partitioning during the migration.

7. An article comprising a computer readable storage medium to store instructions that when executed by a computer cause the computer to:
    process first data representing a first image of a subsurface region of interest to generate second data representing a second image, the first image being derived from measurements of seismic waves and the second image being generated by partitioning the first image according to one of a source wavefield direction or a receiver wavefield direction;
    process the second data to determine a dip decomposition for each of the directions associated with the partitioning; and
    based on the processing of the second data, generate an angle domain common image gather.

8. The article of claim 7, the storage medium to store instructions that when executed by the computer cause the computer to:
    perform a Fourier transformation of the second image to generate a wavenumber domain representation of the second image; and
    process the wavenumber domain representation to determine the dip decompositions.

9. The article of claim 7, the storage medium to store instructions that when executed by the computer cause the computer to, based on the dip decomposition associated with the direction associated with the partitioning, determine an angle of incidence for each of the directions.

10. The article of claim 9, the storage medium to store instructions that when executed by the computer cause the computer to:
    form a third image based on the angles of incidence and the wavenumber domain representation of the second image; and
    perform an inverse Fourier transformation of the third image to generate the angle domain common image gather.

11. The article of claim 7, the storage medium to store instructions that when executed by the computer cause the computer to, based on the dip decomposition associated with the direction associated with the partitioning, determine an azimuth for each of the directions.

12. The article of claim 7, the storage medium to store instructions that when executed by the computer cause the computer to:
perform migration to generate the first data; and
determine directions associated with the partitioning during the migration.

13. A system comprising:
an interface to receive first data representing a first image of a subsurface region of interest derived from measurements of seismic waves; and
a processor to:
process the first data to partition the first image according to a source wavefield direction or a receiver wavefield direction to generate second data representing a second image;
process the second data to determine a dip decomposition for the direction associated with the partitioning; and
based on the processing of the second data, generate an angle domain common image gather.

14. The system of claim 13, wherein the processor is adapted to:
process the second data to perform a Fourier transformation of the second image to generate a wavenumber domain representation of the second image; and
process the wavenumber domain representation to determine the dip decompositions.

15. The system of claim 13, wherein the processor is adapted to, based on the dip decomposition associated with the direction associated with the partitioning, determine an angle of incidence for each of the directions.

16. The system of claim 15, wherein the processor is adapted to:
form a third image based on the angles of incidence and the wavenumber domain representation of the second image; and
perform an inverse Fourier transformation of the third image to generate the angle domain common image gather.

17. The system of claim 13, wherein the processor is adapted to:
based on the dip decomposition associated with the direction associated with the partitioning, determine an azimuth for each of the directions.

* * * * *